United States Patent [19]
Galloway

[11] Patent Number: 5,292,695
[45] Date of Patent: Mar. 8, 1994

[54] PROCESS FOR REACTIVATING PARTICULATE ADSORBENTS

[75] Inventor: Terry R. Galloway, San Leandro, Calif.

[73] Assignee: Synthetica Technologies, Inc., Richmond, Calif.

[21] Appl. No.: 978,265

[22] Filed: Nov. 18, 1992

[51] Int. Cl.$^5$ .................. B01J 20/34; B01J 38/10; B01J 38/06
[52] U.S. Cl. ............................. 502/53; 502/55
[58] Field of Search ............ 502/53, 55, 34, 56

[56] References Cited

U.S. PATENT DOCUMENTS

| | | | |
|---|---|---|---|
| 4,211,718 | 7/1980 | Finch et al. | 502/53 |
| 4,863,702 | 9/1989 | Galloway et al. | 422/189 |
| 4,874,589 | 10/1989 | Galloway | 422/189 |

FOREIGN PATENT DOCUMENTS 62-30527  2/1987  Japan ..................... 502/53
428413  5/1935  United Kingdom ............ 502/53

Primary Examiner—Paul E. Konopka
Attorney, Agent, or Firm—McCubbrey, Bartels & Ward

[57] ABSTRACT

A method is described to reactivating contaminated particulate adsorbent material. A gas stream is passed through the adsorbent material. The gas stream comprises hydrogen, carbon monoxide and steam, and is substantially free of unbound oxygen. The temperature and flow rate of the gas stream is selected to volatilize organic compounds adsorbed by the adsorbent material. Thereafter, the gas stream is reacted with steam at a temperature of at least 700° F. The steam with which the gas stream is reacted is in excess of the stoichiometric amount required to react with substantially all of the organic compounds in the gas stream. Thereafter the gas stream is circulated back to the adsorbent material for further passing therethrough. The cycle is continued until the level of contamination of the adsorbent material is below a predetermined level.

7 Claims, 1 Drawing Sheet

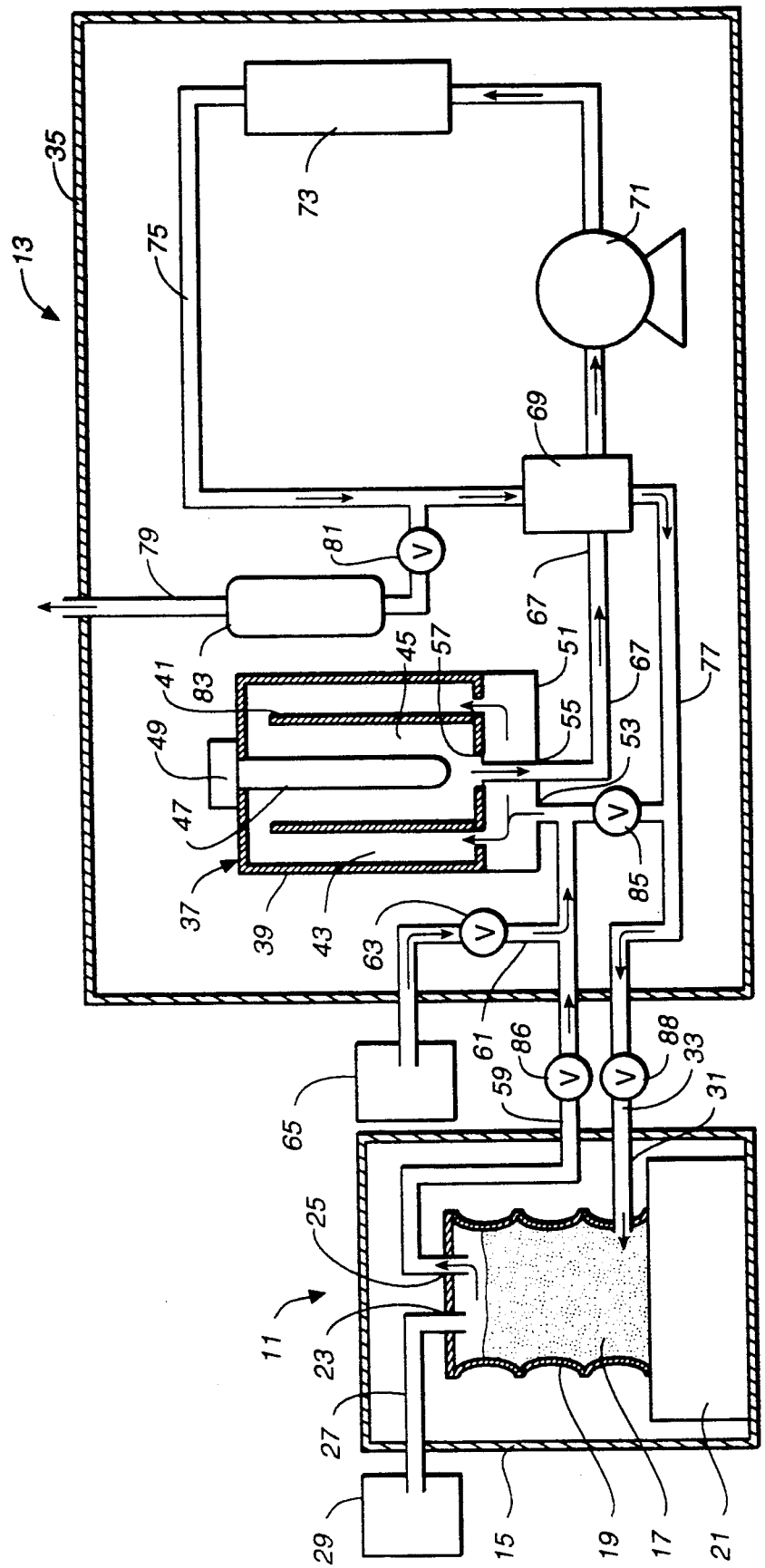

PROCESS FOR REACTIVATING PARTICULATE ADSORBENTS

This invention relates to the reactivation of contaminated particulate adsorbent material, such as granular carbon. More particularly, the invention relates to an improved process for reactivating such materials.

BACKGROUND OF THE INVENTION

Particulate adsorbent materials are used extensively for a variety of applications. Such materials act to adsorb, on the particle surfaces, one or more components of a fluid being processed. Granular carbon, alumina, silica, natural minerals and various catalysts are all examples of such materials.

After a period of use, particulate adsorbent materials lose their effectiveness as a result of the build-up of adsorbed materials on the surfaces and in the pores of the particles. The spent adsorbent material may, in some cases, be merely disposed of in a suitable landfill of the like. However, in many instances this is not practical or even possible, due to the high cost of the adsorbent material and/or environmental hazards. Accordingly, various processes have been developed for reactivating or regenerating such adsorbent materials.

So-called non-thermal process for the reactivation of particulate adsorbent materials include the use of biologic agents, solvents, reactive chemicals, and high vacuum. Some of these processes are very slow. Some do not accomplish a high degree of reactivation resulting in much shorter re-use life for the reactivated material. Some processes result in an effluent which is difficult or expensive to dispose of, and may constitute environmental hazards.

Several types of so-called thermal reactivation processes are used to reactivate particulate adsorbent material. Typically, such processes subject the material to a high temperature to volatilize or pyrolize adsorbed organic compounds. Such processes also may be accompanied by controlled chemical reaction with steam, carbon dioxide or oxygen. These types of processes may be carried out in multiple hearth vertical furnaces, rotary kilns, electrical furnaces, or fluidized bed furnaces. Such processes, however, because of the relatively large and expensive equipment used, often require removal of the contaminated adsorbent material to a specific site at which the thermal regeneration or reactivation furnace or kiln is located. Such processes are also extremely energy intensive, may be hazardous, and often result in substantial loss of the adsorbent material due to oxidation or other chemical reaction.

So-called steam reforming is a process which has been used to reactivate contaminated particulate adsorbent material. Alternatively, a non-condensible hot gas such as nitrogen, or mixtures of steam and other hot gases, may be used. In these processes, the hot steam or gas volatilizes the organics on the particulate adsorbent material, entraining them in the gas stream for subsequent condensation and recovery. Such processes, thus far, have typically not achieved a high enough level of removal of adsorbed compounds, resulting in substantially diminished effectiveness of the reactivated adsorbent materials.

An object of the present invention is to provide an improved process for reactivating particulate adsorbent materials, such as granular carbon.

Another object of the invention is to provide an improved reactivation process which is capable of being used "on site", obviating the need for shipping contaminated adsorbent materials.

Another object of the invention is to provide an improved reactivation process which is relatively low in cost of equipment, operation, and maintenance.

Another object is to advance the reactivation process by using reactive gases such as $H_2$ and CO and steam-reform the heavier organics down in the pores of the particulates and clean the pores.

Another object of the invention is to provide an improved reactivation process wherein the loss of particulate adsorbent material is minimized, and wherein a high effectiveness of the reactivated material can be repeatedly achieved.

A further object of the invention is provide an improved reactivation process wherein optimum operating parameters can be readily established during the process.

Other objects of the invention will become apparent to those skilled in the art from the following description.

BRIEF DESCRIPTION OF THE DRAWINGS

The accompanying drawing illustrates a system wherein the process of the invention may be practiced.

SUMMARY OF THE INVENTION

Very generally, the method of the invention reactivates contaminated particulate adsorbent material by confining such material to an enclosed space while passing therethrough a gas stream. The gas stream is comprised substantially of steam, hydrogen and carbon monoxide, and is substantially free of unbound oxygen. The temperature and flow rate of the gas stream is selected to volatilize organic compounds adsorbed by adsorbent material such that they are entrained in the gas stream. Thereafter, the gas stream is reacted with steam at a temperature of at least 700° F. The steam is present in an amount in excess of the stoichiometric amount required to react with substantially all organic compounds in the gas stream. Thereafter, the gas stream is circulated back to the adsorbent material for passing therethrough. The foregoing steps are continued until the level of contamination of the adsorbent material is below a preselected level.

DETAILED DESCRIPTION OF THE INVENTION

Referring now to FIG. 1, a schematic diagram is presented illustrating a system in which the method of the present invention may be practiced. The system comprises two major components, namely, an evaporator 11 and a detoxifier 13. An evaporator suitable for use as the evaporator 11 is shown and described in U.S. Pat. No. 4,863,702, assigned to the assignee of the present invention. A thermolytic detoxifier suitable for use as the detoxifier 13 is shown and described in U.S. Pat. No. 4,874,587, also assigned to the assignee of the present invention. Both patents are incorporated herein by reference. Generally, the evaporator 11 includes an outer housing 15 which is sealed from the ambient atmosphere. The housing 15 has a door, not shown, through which containers of material to be processed may be inserted and removed. In the illustrated embodiment, particulate adsorbent material is shown at 17 contained in a steel drum or the like 19. The drum is supported on a platform 21 interiorly of the housing 15. The drum 19 is provided with two connections 23 and 25 in its upper wall. The connection 23 communicates through a conduit 27 with a source 29 of a suitable purge gas, such as carbon dioxide, a methane-water mixture, or an acetone-water mixture. A further connection 31 is provided at the lower end of the drum 19 through which inlet gases from the thermolytic detoxifier 13 are passed into the particulate material 17 via the conduit 33.

The illustrated evaporator 11 is designed to handle standard 55 gallon drums containing contaminated particulate material. However, other arrangement for containing the particulate material during the evaporation of contaminants may be employed. For example, the particulate material can be fed through a suitable hopper feeder, not shown, to a drum or bed contained within the evaporator 11 and to which suitable connection is made to provide a flow of the hot gas through the particulate material. Alternatively, the gas effluent from the detoxifier 13 can be passed through an existing installed carbon bed in an all-metal vessel. In such a case, the existing installed carbon bed in the vessel itself serves as the evaporator 11. Any suitable means for confining contaminated adsorbent material to an enclosed space while passing a gas stream thereto may be employed. The various components of the thermolytic detoxifier 13 are contained in a suitable enclosure indicated at 35.

The thermolytic detoxifier 13 includes a reactor shown generally at 37. The reactor 37 includes a substantially cylindrical housing 39 and a coaxial substantially cylindrical inner wall 41. The cylindrical wall 41 and the cylindrical housing 39 define an outer annular space 43. The cylindrical wall 41 further defines an inner space 45 which communicates with the annular space 43 through an opening provided between the upper end of the cylindrical wall 41 and the upper surface of the housing 39. An elongated U-shaped heating element 47 extends downwardly into the space 45 from a heater power supply indicated schematically at 49.

At the bottom of the reactor 37, a heat exchanger 51 is provided. A heat exchanger of suitable construction is shown and described in detail in U.S. patent application Ser. No. 685,532 which is incorporated herein by reference. Gas enters the heat exchanger 51 through an entry port 53 and exits the heat exchanger 51 via an exit port 55. Gas entering the heat exchanger through the entrance port 53 passes from the heat exchanger upwardly into the annular space 43 of the reactor 37. Gas exits the reactor 37 via a port 57 in the bottom of the space 45, passes through the heat exchanger 51 and exits same via the exit port 55. The entry port 53 is coupled via a conduit 59 to the connector 25 at the top of the drum 19, passing via the conduit 59 through the walls of the housings 15 and 35.

Also coupled to the conduit 59 via a conduit 61 and flow regulator valve 63 is a source 65 of superheated steam. Effluent leaving the reactor 37 via the exit port 55 of the heat exchanger 51 is passed via a conduit 67 through a heat exchanger 69, a turbine 71, and an adsorber bed 73, and back to the heat exchanger 69 via a conduit 75. The adsorber bed 73 may comprise one or more beds of adsorbent material such as activated carbon to remove trace organics and metals and Selesorb ® to remove any halogens. Gas passing through the heat exchanger 69 via the conduit 75 is then passed through a conduit 77 through the walls of the housings 35 and 15 and into the drum 19 via the connector 31.

Venting of the system is provided by a vent line 79 which passes through a vent valve 81 and a carbon monoxide converter 83. The latter operates to convert vent gasses to carbon dioxide and water. A shunt valve 85 connects the conduit 59 with the conduit 77 for by-passing the evaporator 11 during the initial start-up and cleaning cycle. During bypass, normally open valves 86 and 88 in the conduits 59 and 33, respectively, are closed.

Operation of the foregoing described apparatus to practice the method of the invention will now be described in connection with the reactivation of granular carbon. Granular carbon is used extensively in the semiconductor industry to adsorb organic solvents used to apply coatings onto surfaces of silicon wafers. Environmental regulations typically require that such organic solvents be removed from any air prior to its discharge into the atmosphere. Such carbon beds are normally either a carbon canister in the size of a fifty-five gallon drum, a larger carbon bed approximately 4 ft. × 4 ft. × 8 ft. in dimension, or a large bed, e.g. 20,000 lbs, is reactivated in place as installed. In any case, these beds have a limited adsorption capacity and must be replaced periodically with fresh carbon beds.

Transport of the carbon beds off site for reactivation is expensive and may constitute an environmental hazard. With the apparatus described above, the method of the invention may be employed on site to reactivate such carbon beds. This represents a significant cost reduction as well as alleviating the environmental hazard.

Furthermore, it has been found that use of the illustrated apparatus to practice the method of the invention results in a significant and unexpected increase in the number of times the carbon beds can be reused. It is believed that this improvement occurs because of the presence of hydrogen in the gas stream being passed through the carbon bed. The relatively small molecules of hydrogen are able to penetrate interstices or pores in the carbon particles, facilitating release of entrapped contaminates. Because the method of the invention is a closed cycle, the steps may be repeated until a desired level of reactivation is achieved.

Once a drum 19 or other container of contaminated carbon is placed in the evaporator 11, the container is purged with carbon dioxide to remove residual free or unbound oxygen. Following this, the closed cycle process is begun. Hot gasses from the reactor 37, after circulation through the heat exchanger 69 by the turbine 71 are fed through the adsorber beds 73 back through the heat exchanger 69 and into the carbon bed 17. As will be explained, this gas comprises carbon monoxide, hydrogen, and steam, and is substantially devoid of any free or unbound oxygen. The gas flow through the carbon heats the carbon and vaporizes the organics adsorbed thereon. The temperature of the gas is "ramped" through the various range of boiling points of the adsorbed materials for best efficiency. This also avoids coking of the heavy organics within the pores of the particulate material. The superficial flow velocity of the gas through the bed 17 is preferably between about three feet per minute and about forty feet per minute.

Following passage through the carbon, the evaporated organics entrained in the gas stream are passed into the reactor 37 through the heat exchanger 51. Gases travelling upwardly in the annular space 43 are further heated as a result of conduction through the cylindrical wall 41 from the higher temperature space 45. Turbulent flow in the annular space 43 provides mixing of the gases in the gas stream. In addition, a predetermined amount of steam, preheated from the source 65, is introduced to the gas stream via the valve 63 and conduit 61. The amount of steam introduced is selected to be an excess of the stoichiometric amount required to react with substantially all the organic compounds in the gas stream.

After passage through the annular space 43, the gas stream enters the central space 45 of the reactor 37 wherein further reaction takes place between the water molecules and the molecules of the organics. The resultant reaction products are carbon monoxide and hydrogen. These effluent product, along with the excess steam, leave the reactor 37 via the heat exchanger 51 and, as explained above, are returned to the carbon bed 17. The method by which detoxification occurs in the reactor 37 is more completely described in the aforesaid U.S. Pat. No. 4,874,587 incorporated herein by reference.

Determination of the level of reactivation of the carbon may be readily made by suitably monitoring temperatures and pressures within the illustrated system and by monitoring the carbon monoxide concentration in the effluent gas leaving the reactor 37. The CO is particularly useful in that (2 electrochemical sensors are cheap and reliable and the CO is produced in the detoxifier when the organics (desorbed from the carbon) are steam-reformed in the detoxifier to produce CO that can be measured in real-time. Pressures and temperatures also provide a redundant check on the proper operation of the process in real-time. This provides a significant advantage over known techniques for reactivating carbon wherein testing of the level of reactivation requires termination of the reactivation process. The method of the current invention enables real time process control and selection of optimal operating parameters during the reactivation process.

The method of the invention has been applied to reactivate granular carbon upon which a solvent composed of 99% toluene, 0.5% trichloroethane, and 0.5% dichlorobenzene had been adsorbed. The level of adsorption in the loaded carbon was 15% by weight and had occurred over a period of approximately 6 days. The carbon was contained in a 55-gallon 16-gauge steel sorbent vessel, and comprised 4×10 mesh (0.1–0.2 inches diameter particles) granular activated carbon obtainable from Calgon ® Carbon.

The carbon was reactivated by placing it into an evaporator of the configuration described above. Hot regenerant gas entered at the bottom of the carbon and was drawn off at the top and passed to the detoxification unit. The direction of flow of the regenerant gas was opposite to the flow of solvents through the carbon as they were loaded. The regenerant gas was brought up to the desired reactivation temperature, depending upon the organic in the carbon, in the range of 260°–650° C. Regeneration was complete in approximately 1½ hours. Cooling occurred over a period of 20 minutes.

Analytic samples of the carbon were taken and analyzed as indicated in TABLE 1 with headings as (1) Virgin Carbon (highest grade), (2) Typical Virgin BPL (commercial grade), (3) Loaded with Solvent, (4) Reactivated first at 500° F., and (5) Reactivated second at 400° F. The samples were taken throughout the carbon column, uniformly distributed with depth and radius to accomplish a truly composite sample of the entire carbon mass. From these data the number of useful cycle lives can be estimated.

The iodine number (which is a standard measure of the capacity the carbon) was recovered from 94–100%, $CCl_4$ to 93–100% of its virgin value on first reactivation, 93% on second and 100% on third. The loading remaining on the reactivated sample was very low at 4.2%. The reactivated carbon was better than most virgin carbon.

The reactivated carbon bed was then reloaded with the solvent mixture as above and repeatedly reactivated for many cycles. The results show that restoration to 3 to 5% of unloaded carbon values is achieved. From these data, it can be seen that 5 to 10 cycles can be extracted before the capacity and selectivity is degraded significantly to adversely affect its typical 15% capacity.

TABLE 1

| Analysis | Virgin Carbon | Typical Virgin BPL | Loaded w/ Solvent | Reactivated First | Reactivated Second | Reactivated Third | Reactivated Eighth |
|---|---|---|---|---|---|---|---|
| MULTI-REACTIVATION OF GRANULAR ACTIVATED CARBON | | | | | | | |
| A.D. Air, g/cc | — | — | 0.574 | — | — | — | — |
| A.D. Oven, g/cc | 0.486 | 0.488 | 0.527 | 0.504 | — | — | — |
| A.D. Oven, g/cc | 0.472 | 0.488 | 0.524 | 0.492 | 0.504 | 0.515 | 0.559 |
| Oven Moisture, % | 0.9 | — | — | 23.0 | 2.48 | — | 1.01 |
| Dean Stark Moisture, % | — | — | 1.0 | — | — | — | — |
| Iodine No., mg/g | 1106 | 1065 | 845 | 1070 | — | — | — |
| Iodine No., mg/g #2 | 1074 | 1065 | 777 | 1014 | 996 | 996 | 745 |
| $CCl_4$, wt % | 63.4 | 62.2 | 51.9 | 61.8 | — | — | — |
| $CCl_4$, wt % #2 | 72 | 62.2 | 54 | 67 | 62.2 | 62.3 | 49.0 |
| Ash, % | 5.8 | 7.1 | 5.7 | 6.1 | — | — | — |
| Ash, % | 6.05 | 7.1 | 5.42 | 5.98 | 6.07 | 6.28 | 6.07 |
| Butane No., cc/g | 0.426 | — | 0.332 | 0.410 | — | — | — |
| Butane | 0.243 | — | 0.175 | 0.230 | — | — | — |

TABLE 1-continued

MULTI-REACTIVATION OF GRANULAR ACTIVATED CARBON

| Analysis | Virgin Carbon | Typical Virgin BPL | Loaded w/ Solvent | Reactivated First | Reactivated Second | Reactivated Third | Reactivated Eighth |
|---|---|---|---|---|---|---|---|
| Ret., cc/g Butane | 5.28 | — | 5.01 | 5.32 | — | — | — |
| w/c, g/cc Vol. Mat., % (closed) | 3.05 | 7.1 | 7.16 | 4.53 | 4.04 | 3.3 | 4.67 |
| Water, % | 1.53 | 7.1 | 2.97 | 0.68 | — | 0.48 | 1.32 |

1 Tested by Calgon ® Carbon
2 Tested by AtoChem ®

It may be seen, therefore, that the method of the invention provides an improved process for reactivating particulate adsorbent material, such as granular activated carbon. Material may be reactivated without commingling with carbon from other uses and applications and can be done on site, obviating the need for transportation of hazardous materials. The particulate adsorbent material is reactivated with only a 3-5% loss from its unloaded values of adsorption capacity in a cost effective and safe way.

There are many other applications of this reactivation process applied to molecular sieves, zeoliter, silicon, natural adsorbent minerals, etc. that are used to capture organics. Also this process applies to catalysts which are poisoned, infected or deactivated by organic foulants. There are also many other types of filter media that can be restored by this process. Various modifications of the invention in addition to those shown and described will become apparent to those skilled in the art from the foregoing description and accompanying drawing. Such modifications are intended to fall within the scope of the appended claims.

What is claimed is:

1. A method for reactivating contaminated particulate adsorbent material, comprising, confining said contaminated adsorbent material to an enclosed space while passing therethrough a gas stream comprised substantially of steam, hydrogen, and carbon monoxide, said gas stream being substantially free of unbound oxygen and being at a temperature and a flow rate selected to volatilize volatile organic compounds adsorbed by said adsorbent material, thereafter reacting the gas stream with steam at a temperature of at least 700° F. in a reaction zone separate from said enclosed space, said steam being in excess of the stoichiometric amount required to react with substantially all organic compounds in the gas stream, and thereafter circulating said gas stream back to said adsorbent material in said enclosed space for passing therethrough, and continuing said steps until the level of contamination of said adsorbent material by said adsorbed volatile organic compounds is below level, sufficient to produce reactivation of said adsorbent material.

2. A method according to claim 1 wherein the gas stream is passed through an adsorber prior to recirculation to said adsorbent material.

3. A method according to claim 1 wherein the flow rate of the gas stream through said adsorbent material is below that which would entrain particles thereof in the gas stream.

4. A method according to claim 1 wherein the step of reacting the gas stream with steam is carried out in a thermolytic decomposition reactor.

5. A method according to claim 1 wherein the temperature of the gas stream in the said adsorbent material is between about 200° F. and about 1200° F.

6. A method according to claim 1 wherein the superficial flow velocity of the gas stream through said adsorbent material is between about three feet per minute and about forty per minute.

7. A method according to claim 1 wherein said particulate adsorbent material is granulated activated carbon.

* * * * *